May 9, 1967 P. AEMMER 3,319,177

GAIN REGULATING TRANSISTOR CIRCUIT FOR A PLURALITY OF AMPLIFIER STAGES

Filed Aug. 21, 1964 2 Sheets-Sheet 1

United States Patent Office
3,319,177
Patented May 9, 1967

3,319,177

GAIN REGULATING TRANSISTOR CIRCUIT FOR A PLURALITY OF AMPLIFIER STAGES

Peter Aemmer, Zurich, Switzerland, assignor to Albiswerk Zurich A.G., Zurich, Switzerland, a Swiss corporation
Filed Aug. 21, 1964, Ser. No. 391,108
Claims priority, application Switzerland, Aug. 23, 1963, 10,426/63
13 Claims. (Cl. 330—29)

My invention relates to circuitry for regulating the amplifying gain of a plurality of similar or substantially identical transistor A.C. amplifiers by means of regulating currents having a determined relationship with each other. More particularly, the present invention relates to the gain regulation of a transistor cascade network to the end stage of which a control transistor in common emitter configuration is controlled through a detector and furnishes a collector current to serve as gain regulating current for one of the amplifiers in the cascade network.

For regulating the amplifying gain of the A.C. amplifier, the output voltage of the amplifier is applied to a rectifier, and the rectified voltage, after the high frequency ripples are filtered out, is applied to a D.C. amplifier for impedance transformation. The resulting voltage is proportional to the output voltage of the amplifier and is applicable as a regulating voltage.

In transistorized amplifiers, the amplifying factor or gain is not regulated at the amplifying component by varying the working point, as is conventionally done with amplifying tubes, but is effected by means of an attenuating member acting upon the signal path. The attenuating members employed for this purpose are electrically controllable resistances such as, for example, diodes or temperature-responsive resistors.

The regulating voltage from the aforementioned D.C. amplifier is impressed upon the attenuating network comprising diodes. In such an arrangement, it has been found that the incremental regulating steepness or the rate of regulating change depends considerably upon the regulating condition or the value of the resistance being controlled. This disadvantage is avoided by causing the regulating current to cause a current flow in the attenuating network comprising diodes. This regulating current comprises the collector current of a transistor in common emitter configuration, whose base is connected with a low ohmic output of the aforementioned D.C. amplifier.

If several amplifiers of an amplifier chain or cascade are to be regulated, then the regulating current, according to known circuitry, is passed through the corresponding attenuating networks connected in series. This, however, entails the disadvantage that due to a special separation of the individual stages of an amplifier chain or cascade, the maintenance and adjusting work becomes much more complicated and difficult.

Thus, in a radar installation having a remotely located data processing center, the preamplifiers are located in the antenna portion of the equipment whereas the main amplifier and the means for generating the gain regulating current are located in the data processing center. When testing or adjusting the equipment, the series connection of the aforementioned attenuating networks requires feeding the testing signals to the equipment at the locality of the preamplifier. Thus, the testing can no longer be performed by only one serviceman and the two localities thus to be serviced simultaneously must be connected by telephone.

In a series connection of several diode containing attenuating members with coupling capacitors for properly coupling the A.C. circuitry with the diode current regulating circuit for the amplifiers in which the regulated attenuation serves to effect gain control, there occurs a time delay of the regulating action. The cause of this time delay is the equalizing currents which flow as a consequence of potential changes occurring at the coupling capacitors due to changes of the regulating current. These equalizing currents also flow through the attenuating members and counteract the regulating currents.

It is an object of my invention to eliminate the aforementioned disadvantages heretofore encountered in the gain regulation of a plurality of chain or cascade connected transistor A.C. amplifiers of substantially identical electrical design. More specifically, it is an object of the present invention to permit adjusting, servicing or testing the gain regulation at a single location and by a single person even if the cascade connected amplifiers are remote from each other.

Another more specific object of the invention is to minimize or obviate the occurrence of the aforementioned time delay and gain regulating action.

In accordance with the present invention, these results are achieved in A.C. transistor amplifier networks of the type described, by connecting into the emitter circuit of the control transistor, operating as a controlled source of regulating current, the base-emitter path of a second transistor. The second transistor is connected in complementary relation with the first transistor. The collector current of the first transistor is supplied to at least one transistor amplifier of the cascade network to serve as gain regulating current for such amplifier. The collector current of the second transistor is supplied to at least one other transistor amplifier of the cascade network to serve as gain regulating current for such amplifier.

The aforementioned and further objects, advantages and features of my invention, said features being set forth with particularity in the claims annexed hereto, will be apparent from, and will be mentioned in, the following description in conjunction with embodiments of amplifier circuits according to the invention illustrated by way of example in the accompanying drawings, wherein:

Figure 3:
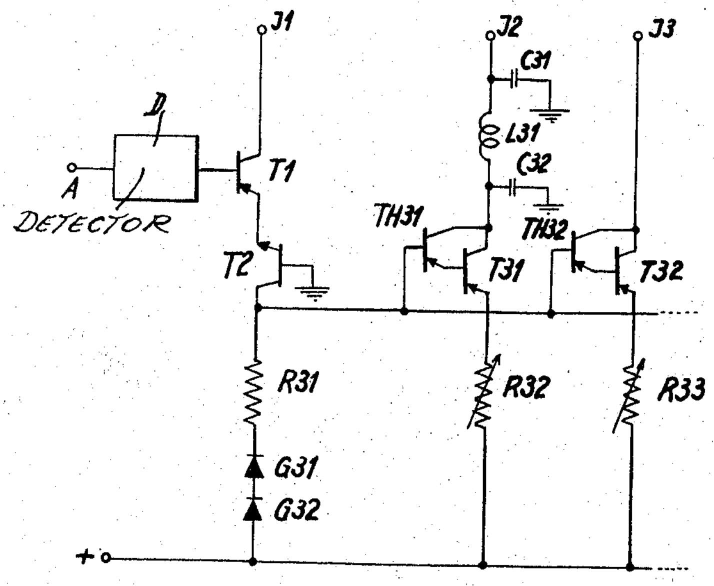
Figure 4:
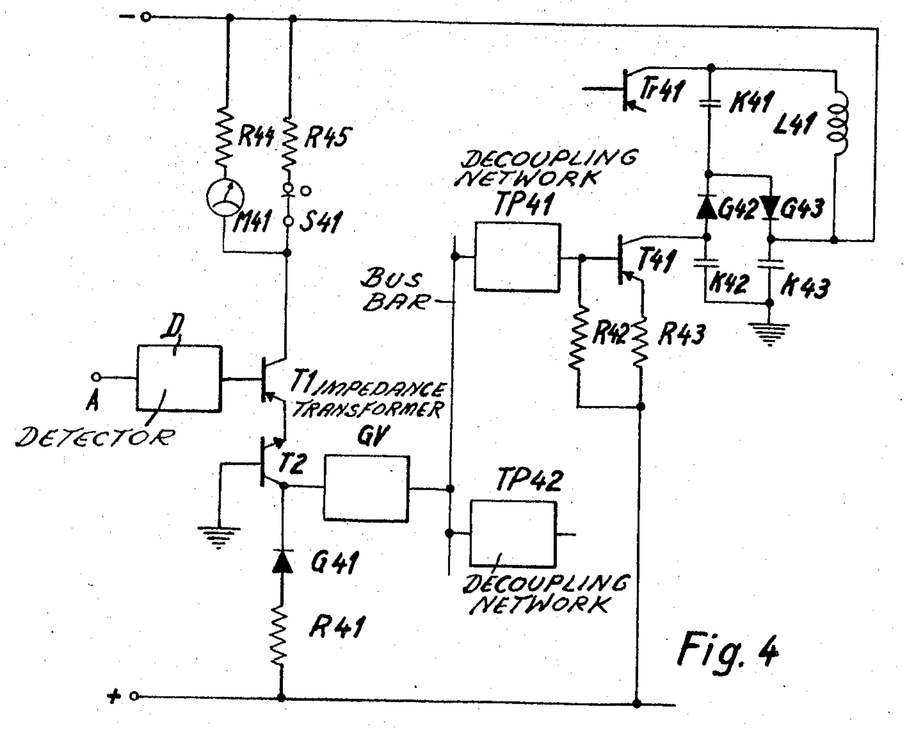

FIG. 3 is a circuit diagram of another embodiment of the gain regulating circuit arrangement of the present invention in which a single source of gain regulating current functions to simultaneously procure a rapid and slowly regulating distribution of the regulating current; and FIG. 4 is a circuit diagram of still another embodiment of the gain regulating circuit arrangement of the present invention.

Figure 1:
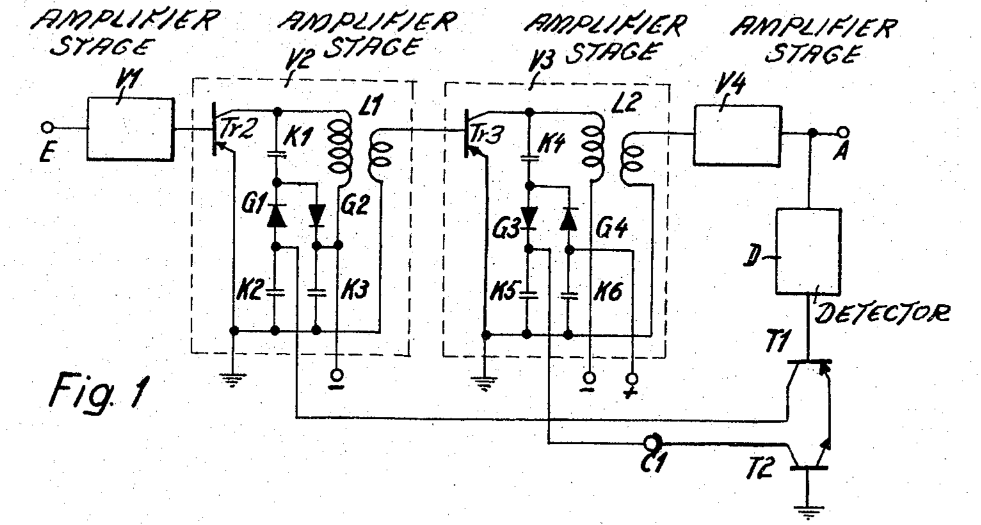
FIG. 1 is a circuit diagram of an embodiment of a transistor A.C. amplifier cascade comprising two amplifying stages which are both gain regulated in accordance with an embodiment of the gain regulating circuit arrangement of the present invention.

In FIG. 1, the amplifier circuit comprises four amplifier stages V1, V2, V3 and V4. The signal to be amplified is supplied at an input E. The amplified signal is provided at the output A. Connected to the output A is a detector D for deriving a regulating voltage. The detector D comprises a known arrangement of a rectifier stage, a low pass filter and a D.C. amplifier. The regulating voltage at the output of the detector D is applied to the base of a first control transistor T1 of PNP type and controls said transistor. The collector circuit of the first control transistor T1 carries a current dependent upon the regulating voltage at the output of the detector D.

The collector current of the first control transistor T1 controls the attenuation of the amplifier stage V2 which comprises a transistor Tr2, a transformer L1, diodes G1 and G2 and capacitors K1, K2 and K3. A second control transistor T2, complementary to the first control transistor T1 and of NPN type, is connected in the emitter circuit of said transistor T1 so that the emitter current of said transistor T1 flows through the base-emitter path of said transistor T2.

The second control transistor T2, operating in common base configuration, produces a collector current which at any time is equal to the emitter current. The collector current of the second control transistor T2 is passed through a plug connection C1 to the amplifier stage V3 to serve as a gain regulating current. The plug connection C1 may comprise any suitable breakable circuit connection. The amplifier stage V3 comprises transistor Tr3, a transformer L2, diodes G3 and G4 and capacitors K4, K5 and K6. In principle, the amplifier stages V1 and V4 may be of a design and circuitry identical with the amplifier stages V2 and V3.

The damping performance of the attenuating networks is known. It is described, for example, in the German published patent application No. 1,116,746. In the embodiment of FIG. 1, each amplifier stage has two attenuating networks for gain control. The attenuating networks of the amplifier stage V2 comprise two series connected diodes G1 and G2, and the attenuating networks of the amplifier stage V3 comprise two series connected diodes G3 and G4.

The two diodes in each stage are connected between the input point for the regulating current and one pole of the voltage source. A common point of the connection between the two diodes G1 and G2 of the amplifier stage V2 is connected through the capacitor K1 to the collector of the transistor Tr2, which collector is also connected to one end of one winding of the transformer L1. A common point of the connection between the two diodes G3 and G4 of the amplifier stage V3 is connected through the capacitor K4 to the collector of the transistor Tr3, which collector is also connected to one end of one winding of the transformer L2.

The other end of the winding of the transformer L1 from that to which the collector of the transistor Tr2 is connected is connected to the negative pole of the voltage source, as is the other end of the winding of the transformer L2 from that to which the collector of the transistor Tr3 is connected. The capacitors K2 and K3, and K5 and K6 function to decouple the D.C. path from the A.C. portion of the circuits.

Since the first control transistor T1 is a PNP transistor, the diodes G1 and G2 of the amplifier stage V2 must be poled in such a sense that the negative potential of the voltage source is applied to the collector of said transistor T1. Analogously, the diodes G3 and G4 of the amplifier stage V3 must be poled inversely so that the positive potential of the voltage source is applied to the collector of the NPN transistor T2.

An advantage of the embodiment of FIG. 1 is that the same current flows in the collectors of both transistors T1 and T2, but that the current flow to the amplifier stage V3 may be interrupted at the separation point C1 without affecting the current flow to the amplifier stage V2.

Figure 2:
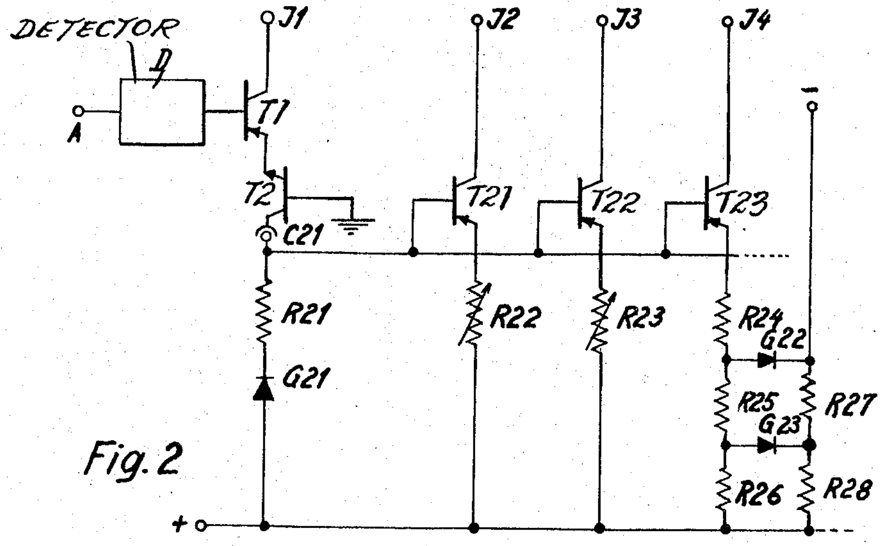
FIG. 2 is a circuit diagram of another embodiment of the gain regulating circuit arrangement of the present invention in which the regulation of a plurality of transistor amplifier stages is effected by respective gain control currents and in which one of these currents is in non-linear relation to the others.

The gain regulating circuit arrangement of FIG. 2 is based upon that of FIG. 1 and is modified so that the collector current of the second control transistor T2 functions to effect a plurality of regulating operations. A detector D is connected to the output A of a chain or cascade of amplifier stages similar to that of FIG. 1. The detector D, hereinbefore mentioned, comprises a rectifier, a low pass filter and a D.C. amplifier.

The PNP transistor T1 serves as a control source of regulating current. The complementary NPN transistor T2 is connected in the emitter circuit of the transistor T1 in the same manner as in FIG. 1. The collector of the first control transistor T1 is connected to the negative pole of a voltage source via the terminal J1 and via a regulating network (not shown). The collector of the second control transistor T2 is connected to the positive pole of a voltage source through a resistor R21 and a diode G21 connected in series with said resistor.

The collector circuit of the second control transistor T2 may include a separating or plug connection C21 corresponding to the one denoted by C1 in FIG. 1. A plurality of PNP transistors such as, for example, three transistors T21, T22 and T23, have their respective bases connected through the plug connection C21 to the collector of the second control transistor T2. The transistors T21, T22 and T23 are thus controlled by the collector potential of the transistor T2.

To variable resistors R22 and R23 are shown connected in the respective emitter circuits of the transistors T21 and T22. A non-linear network, comprising diodes G22 and G23 and resistors R24, R25, R26, R27 and R28, is connected in the emitter circuit of the transistor T23. The collectors of the transistors T21, T22 and T23 are connected to the negative pole of the voltage source via the terminals J2, J3 and J4, respectively, and via regulating networks (not shown).

The operation of the embodiment of FIG. 2 is similar to that of FIG. 1, except that the collector current of the transistor T2 is not directly applied for gain regulation, but rather the collector potential produced by the voltage drop of resistor R21 is applied for gain regulation. The collector current of the transistors T21 and T22 is proportional to the potential difference between the bases of said transistors and the positive pole of the voltage source with the exception of the voltage drop at the base-emitter junctions of these transistors. The proportionality factor is variable by variation of the variable resistors R22 and R23, since variation of said resistors R22 and R23 varies the degree of negative feedback, thereby varying the amplification factor of the transistors T21 and T22. The diode G21 functions to compensate for the voltage drop at the base-emitter junctions of the transistors T21, T22 and T23.

The non-linear network is an example of the utilization of such a network for non-linear regulation, as may be required for a specific purpose such as, for example, modulation compression. The non-linear network comprises a voltage divider R27, R28 connected between the poles of the voltage source. A voltage divider R24, R25, R26 is connected between the emitter of the transistor T23 and the positive pole of the voltage source. The diode G22 is connected between a common point of the connection between the resistors R24 and R25 and the negative pole of the voltage source. The diode G23 is connected between a common point of the connection between the resistors R25 and R26 and a common point of the connection between the resistors R27 and R28. A regulating current is supplied to the terminal J4 having a magnitude which represents a non-linear function of the regulating signal provided by the detector D. The non-linear function is determined by the design of the non-linear network.

The embodiment of the gain regulating circuit arrangement of FIG. 3, like those of FIGS. 1 and 2, comprises a detector D of the aforementioned kind which is connected between the output A of a chain or cascade of amplifier stages and the base of the first control transistor T1 of PNP type. The base-emitter path of the complementary second control transistor T2 of NPN type in common base configuration is connected in the emitter circuit of transistor T1. The collector of the second control transistor T2 is connected through a resistor R31 and series connected diodes G31 and G32 to the positive pole of a voltage source.

The collector of the first control transistor T1 is connected to a terminal J1 which is to be connected with the attenuating network of an amplifier stage for gain regulation of said amplifier stage. The attenuating or damping network simultaneously applies the negative voltage to the collector of the first control transistor T1. The collector of the second control transistor T2 is further connected to the bases of other transistors such as, for example, two transistors TH31 and TH32. The transistors TH31 and TH32 operate as emitter followers and control separating transistors T31 and T32 at their respective bases.

An adjustable resistor R32 is connected in the emitter circuit of the transistor T31 and an adjustable resistor R33 is connected in the emitter circuit of the transistor T32. A low pass filter, comprising an inductor L31 and two capacitors C31 and C32, is connected in the collector circuit of the transistor T31. The two transistors T31 and T32 received negative collector voltage through the regulating current terminals J2 and J3, respectively. The diodes G31 and G32 serve to compensate for the base-emitter junctions of the transistors T31 and TH31, and T32 and TH32.

The performance of the embodiment of the gain regulating circuit of FIG. 3 in principle, is the same as those of the embodiments of FIGS. 1 and 2. The emitter followers TH31 and TH32 function to relieve the collector current of the transistor T2 if many regulating circuits are to be connected and simultaneously operated.

It is sometimes desirable, for example in monopulse radar equipment, that some amplifier stages in the receiving channels be unaffected by any rapid change in regulating current. In order to achieve such operation, a low pass filter may be connected in the collector circuit of the particular amplifier stage so that only slow changes in regulating current will pass through and become effective. Such a low pass filter, for example, is provided in connection with the regulating current terminal J2 in the embodiment of FIG. 3.

The gain regulating circuit arrangement embodiment of FIG. 4 functions to provide rapid gain regulation exclusively. The output of the detector D controls the base of the first control transistor T1 of PNP type. The complementary second control transistor T2 of NPN type is connected in the emitter circuit of the first control transistor T1. The collector circuit of the transistor T1 differs from the collector circuits of said transistor of the other aforedescribed embodiments in that it includes a controllable or switchable device for measuring the regulating current. In the position of switch S41 indicated in FIG. 4, the collector current of the transistor T1 passes directly from the negative pole of the voltage source through the collector resistor R45. When the switch S41 is open, in the position other than that indicated in FIG. 4, said collector current passes through a resistor R44 and through an ammeter M41.

The collector of the second control transistor T2 is connected to the positive pole of a voltage source through a resistor R41 and a diode G41 connected in series with said resistor. The collector potential of the second control transistor T2 is applied to a bus bar through an impedance transformer GV. The impedance transformer GV has a fixed reference potential relative to the positive pole of the voltage source. Two decoupling networks TP41 and TP42 function to decouple the high frequency currents of the amplifier stages and pass the regulating voltage to the base of a transistor T41 in whose collector circuit the attenuating network for an amplifier stage comprising a transistor T*r*41 and a transformer L41 is connected.

The attenuating or damping network of the amplifier stage comprises two diodes G42 and G43 and capacitors K41, K42 and K43. The resistor R42 is the terminal resistance of the decoupling network TP41. The resistor R43 constitutes the emitter resistor of the transistor T41, corresponding to the resistor R22 of the embodiment of FIG. 2.

Instead of directly connecting the base of the transistor T2 to ground, a bias voltage may be applied to said base in known manner in order to provide for shifting of the transistor working point.

To those skilled in the art, it will be obvious upon a study of this disclosure that my invention permits of various modifications and can be given embodiments other than particularly illustrated and described herein, without departing from the essential features of my invention and within the scope of the claims annexed hereto.

I claim:

1. A gain regulating circuit for regulating the gain of a plurality of substantially similar transistor A.C. amplifier stages connected in cascade arrangement and having an amplifier end stage, said gain regulating circuit comprising
   detector means connected to the amplifier end stage of said cascade arrangement for deriving a regulating voltage therefrom;
   a first transistor having an emitter collector path, a base electrode connected to said detector means, a collector electrode connected to an amplifier stage of said cascade arrangement for supplying a regulating current thereto and an emitter electrode; and
   a second transistor complementary to said first transistor in common base connection having a base-emitter path connected to the emitter-collector path of said first transistor whereby an emitter current of said first transistor controls said second transistor, and a collector electrode connected to another amplifier stage of said cascade arrangement for supplying a regulating current thereto.

2. A gain regulating circuit as claimed in claim 1, further comprising attenuating means connected to the collector electrodes of said first and second transistors.

3. A gain regulating circuit for regulating the gain of a plurality of substantially similar transistor A.C. amplifier stages connected in cascade arrangement and having an amplifier end stage, each of said amplifier stages having attenuating means connected thereto, said gain regulating circuit arrangement comprising
   detector means connected to the amplifier end stage of said cascade arrangement for deriving a regulating voltage therefrom;
   a first transistor having an emitter-collector path, a base electrode connected to said detector means, a collector electrode connected to the attenuating means of an amplifier stage of said cascade arrangement for supplying a regulating current thereto and an emitter electrode; and
   a second transistor complementary to said first transistor in common base connection having a base-emitter path connected to the emitter-collector path of said first transistor whereby an emitter current of said first transistor controls said second transistor, and a collector electrode connected to the attenuating means of another amplifier stage of said cascade arrangement for supplying a regulating current thereto.

4. A gain regulating circuit as claimed in claim 3, wherein said first transistor is of PNP type and said second transistor is of NPN type.

5. A gain regulating circuit as claimed in claim 3, wherein said collector electrode of said first transistor is directly connected to the attenuating means of said amplifier stage and said collector electrode of said second transsistor is directly connected to the attenuating means of said other amplifier stage.

6. A gain regulating circuit as claimed in claim 3, further comprising a breakable circuit connection, and wherein said collector electrode of said first transistor is directly connected to the attenuating means of said amplifier stage and said collector electrode of said second transistor is directly connected to the attenuating means of said other amplifier stage through said breakable circuit connection.

7. A gain regulating circuit as claimed in claim 3, further comprising means for measuring the regulating current connected between the collector electrode of said first transistor and the attenuating means of a corresponding amplifier stage.

8. A gain regulating circuit for regulating the gain of a plurality of substantially similar transistor A.C. amplifier stages connected in cascade arrangement and having an amplifier end stage, each of said amplifier stages having attenuating means connected thereto, said gain regulating circuit arrangement comprising detector means connected to the amplifier end stage of said cascade arrangement for deriving a regulating voltage therefrom;

a first transistor having an emitter-collector path, a base electrode connected to said detector means, a collector electrode connected to the attenuating means of an amplifier stage of said cascade arrangement for supplying a regulating current thereto and an emitter electrode; and a second transistor complementary to said first transistor in common base connection having a base-emitter path connected to the emitter-collector path of said first transistor whereby an emitter current of said first transistor controls said second transistor, and a collector electrode connected to the attenuating means of each of a plurality of other amplifier stages of said cascade arrangement for supplying a regulating current thereto.

9. A gain regulating circuit as claimed in claim 8, further comprising a plurality of additional transistors, and wherein said collector electrode of said second transistor is connected to the attenuating means of each of said plurality of other amplifier stages of said cascade arrangement through a corresponding one of said plurality of additional transistors.

10. A gain regulating circuit as claimed in claim 8, further comprising a plurality of additional transistors each having a base-collector path, and wherein said collector electrode of said second transistor is connected to the attenuating means of each of said plurality of other amplifier stages of said cascade arrangement through the base-collector path of a corresponding one of said plurality of additional transistors.

11. A gain regulating circuit as claimed in claim 10, wherein each of said plurality of additional transistors has an emitter electrode, and further comprising a voltage source, a resistor and a diode connected in series between the collector electrode of said second transistor and said voltage source, a variable resistor connected between the emitter electrode of one of said plurality of additional transistors and said voltage source, and a non-linear network connected between the emitter electrode of another of said plurality of additional transistors and said voltage source.

12. A gain regulating circuit for regulating the gain of a plurality of substantially similar transistor A.C. amplifier stages connected in cascade arrangement and having an amplifier end stage, each of said amplifier stages having attenuating means connected thereto, said gain regulating circuit arrangement comprising detector means connected to the amplifier end stage of said cascade arrangement for deriving a regulating voltage therefrom;

a first transistor having a base electrode connected to said detector means, a collector electrode connected to the attenuating means of an amplifier stage of said cascade arrangement for supplying a regulating current thereto and an emitter electrode;

a second transistor complementary to said first transistor in common base connection having a base-emitter path connected to the emitter electrode of said first transistor and a collector electrode connected to the attenuating means of each of a plurality of other amplifier stages of said cascade arrangement for supplying a regulating current thereto;

a plurality of additional transistors each having an emitter electrode and a base-collector path, the collector electrode of said second transistor being connected to the attenuating means of each of said plurality of other amplifier stages of said cascade arrangement through the base-collector path of a corresponding one of said plurality of additional transistors;

a voltage source;

a resistor;

a pair of diodes connected in series with said resistor, the series connection of said resistor and said diodes being connected between the collector electrode of said second transistor and said voltage source; and low pass filter means connected between the base-collector path of one of said plurality of additional transistors and the attenuating means of the corresponding amplifier stage.

13. A gain regulating circuit for regulating the gain of a plurality of substantially similar transistor A.C. amplifier stages connected in cascade arrangement and having an amplifier end stage, each of said amplifier stages having attenuating means connected thereto, said gain regulating circuit arrangement comprising detector means connected to the amplifier end stage of said cascade arrangement for deriving a regulating voltage therefrom;

a first transistor having a base electrode connected to said detector means, a collector electrode connected to the attenuating means of an amplifier stage of said cascade arrangement for supplying a regulating current thereto and an emitter electrode;

a second transistor complementary to said first transistor in common base connection having a base-emitter path connected to the emitter electrode of said first transistor and a collector electrode connected to the attenuating means of each of a plurality of other amplifier stages of said cascade arrangement for supplying a regulating current thereto;

a plurality of additional transistors each having an emitter electrode and a base-collector path, the collector electrode of said second transistor being connected to the attenuating means of each of said plurality of other amplifier stages of said cascade arrangement through the base-collector path of a corresponding one of said plurality of additional transistors;

a voltage source;

a resistor;

a pair of diodes connected in series with said resistor, the series connection of said resistor and said diodes being connected between the collector electrode of said second transistor and said voltage source;

low pass filter means connected between the base-collector path of one of said plurality of additional transistors and the attenuating means of the corresponding amplifier stage;

a second plurality of additional transistors; and means coupling each of said plurality of additional transistors in emitter follower connection to a corresponding one of each of said second plurality of additional transistors.

References Cited by the Examiner

UNITED STATES PATENTS 3,115,601 12/1963 Harris.

ROY LAKE, *Primary Examiner.*

J. B. MULLINS, *Assistant Examiner.*